(12) United States Patent
Lee

(10) Patent No.: US 8,132,779 B2
(45) Date of Patent: Mar. 13, 2012

(54) SOLENOID VALVE FOR BRAKE SYSTEM AND MANUFACTURING METHOD THEREOF

(75) Inventor: Chung Jae Lee, Gyeonggi-do (KR)

(73) Assignee: Mando Corporation, Gyeonggi-Do (KR)

( * ) Notice: Subject to any disclaimer, the term of this patent is extended or adjusted under 35 U.S.C. 154(b) by 319 days.

(21) Appl. No.: 12/495,538

(22) Filed: Jun. 30, 2009

(65) Prior Publication Data

US 2010/0001216 A1   Jan. 7, 2010

(30) Foreign Application Priority Data

Jul. 2, 2008  (KR) .......................... 10-2008-0063777

(51) Int. Cl.
*F16K 31/02* (2006.01)
(52) U.S. Cl. ............................... 251/129.15; 303/119.2
(58) Field of Classification Search ............. 251/129.15; 303/119.2
See application file for complete search history.

(56) References Cited

U.S. PATENT DOCUMENTS

| | | | | |
|---|---|---|---|---|
| 5,267,785 A * | 12/1993 | Maisch | ...................... | 303/119.2 |
| 5,605,386 A * | 2/1997 | Ziegler et al. | .............. | 303/119.2 |
| 6,152,420 A * | 11/2000 | Hohl | ........................ | 251/129.02 |
| 6,254,199 B1 * | 7/2001 | Megerle et al. | ............ | 303/119.2 |
| 6,588,857 B2 * | 7/2003 | Sim | ............................. | 303/119.2 |
| 6,644,623 B1 * | 11/2003 | Voss et al. | ................ | 251/129.15 |
| 6,988,707 B2 * | 1/2006 | Ahn | ........................ | 251/129.15 |

FOREIGN PATENT DOCUMENTS

KR    10-2004-0091434    10/2004

* cited by examiner

*Primary Examiner* — John Bastianelli
(74) *Attorney, Agent, or Firm* — McDermott Will & Emery LLP

(57) ABSTRACT

Disclosed herein are a solenoid valve for a brake system and a manufacturing method thereof, to achieve easy manufacture and low manufacturing costs via a more simplified configuration than the related art. The solenoid valve includes a valve core, a sleeve into one side of which the valve core is inserted, an armature movably received in the sleeve, a seat having an orifice that is opened or closed by the armature, a return spring to press the armature toward the orifice, a filter member press-fitted in a modulator block having an inlet path and outlet path, a filter being coupled to the filter member, and a seat housing having one side press-fitted into the filter member and the other side press-fitted into the sleeve, the seat being press-fitted in the seat housing. The seat housing takes the form of a tubular member having an approximately constant thickness and is provided with a stepped portion to determine a position of the seat.

3 Claims, 3 Drawing Sheets

SOLENOID VALVE FOR BRAKE SYSTEM AND MANUFACTURING METHOD THEREOF

CROSS-REFERENCE TO RELATED APPLICATION

This application claims the benefit of Korean Patent Application No. 2008-0063777, filed on Jul. 2, 2008 in the Korean Intellectual Property Office, the disclosure of which is incorporated herein by reference.

BACKGROUND

1. Field

Embodiments of the present invention relate to a solenoid valve for a brake system and a manufacturing method thereof, to assure easier manufacture and lower manufacturing costs than the related art.

2. Description of the Related Art

A general vehicular anti-lock brake system is designed to prevent wheel lockup when braking hard by controlling braking pressure applied to wheels based on sensed tire slip.

This assures directional stability and steering control of wheels without tire slip during braking and consequently, safe braking.

This type of brake system includes a plurality of solenoid valves that opens or closes flow-paths of brake hydraulic lines to control braking pressure. Solenoid valves may be classified into normally opened type solenoid valves that are normally kept in an opened state, and normally closed type solenoid valves that are normally kept in a closed state.

FIG. 1 is a sectional view illustrating a conventional normally closed type solenoid valve. The valve is press-fitted into a bore 14 of a modulator block 13 in which flow-paths of a brake system are defined. The valve includes a hollow valve housing 1 having an inlet 3 and an outlet 4 for fluid flow.

A cylindrical sleeve 6 is inserted into one end of the valve housing 1 and in turn, an armature 5 is movably received in the sleeve 6. A valve core 7 is fitted into an open end of the sleeve 6. The valve core 7 serves not only to close an opening of the sleeve 6, but also to move the armature 5. The armature 5 is moved to open or close a first orifice 8a of a valve seat 8. For this, the armature 5 has an opening/closing portion 5a extending toward the valve seat 8 through a hollow 2 of the valve housing 1.

A return spring 9 is interposed between the armature 5 and the valve core 7. The return spring 9 presses the armature 5 to allow the armature 5 to normally close the first orifice 8a. An excitation coil assembly 10 is installed around the sleeve 6 and valve core 7 for movement of the armature 5. A second orifice member 11 having a second orifice 14a is inserted in the valve housing 1, and an O-ring 12 is fitted around the valve housing 1 to seal a gap between the valve housing 1 and an inner surface of the bore 14. Also, a filter member 15 having a filter is fitted around the valve housing 1.

In operation of the above-described solenoid valve, when power is applied to the excitation coil assembly 10 to generate magnetic force, the armature 5 is moved toward the valve core 7 by the magnetic force, thus operating to open the orifice 8a of the valve seat 8. On the other hand, no magnetic force is exerted when no power is applied to the excitation coil assembly 10 and thus, the armature 5 operates to close the orifice 8a by elasticity of the return spring 9.

As described above, the conventional solenoid valve for a brake system is configured such that the valve seat is provided separately from the valve housing and thus, is press-fitted in the valve housing. The valve housing has been mainly formed by forging and therefore, has a great number of components. This results in difficult manufacture and higher production price.

SUMMARY

Therefore, it is an aspect of the present invention to provide a solenoid valve for a brake system and a manufacturing method thereof, to achieve easy manufacture and low manufacturing costs via a more simplified configuration than the related art.

Additional aspects of the invention will be set forth in part in the description which follows and, in part, will be obvious from the description, or may be learned by practice of the invention.

In accordance with one aspect of the present invention, a solenoid valve for a brake system includes a valve core, a sleeve into one side of which the valve core is inserted, an armature movably received in the sleeve, a seat having an orifice that is opened or closed by the armature, a return spring to press the armature toward the orifice, a filter member press-fitted in a modulator block having an inlet path and outlet path, a filter being coupled to the filter member, and a seat housing having one side press-fitted into the filter member and the other side press-fitted into the sleeve, the seat being press-fitted in the seat housing, wherein the seat housing takes the form of a tubular member having an approximately constant thickness and is provided with a stepped portion to determine a position of the seat.

The sleeve may be provided at an end thereof with a flange to allow the sleeve to be coupled to the modulator block.

In accordance with another aspect of the present invention, in a manufacturing method of a solenoid valve for a brake system of claim 1 or 2, the seat housing is integrally formed by deep drawing.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
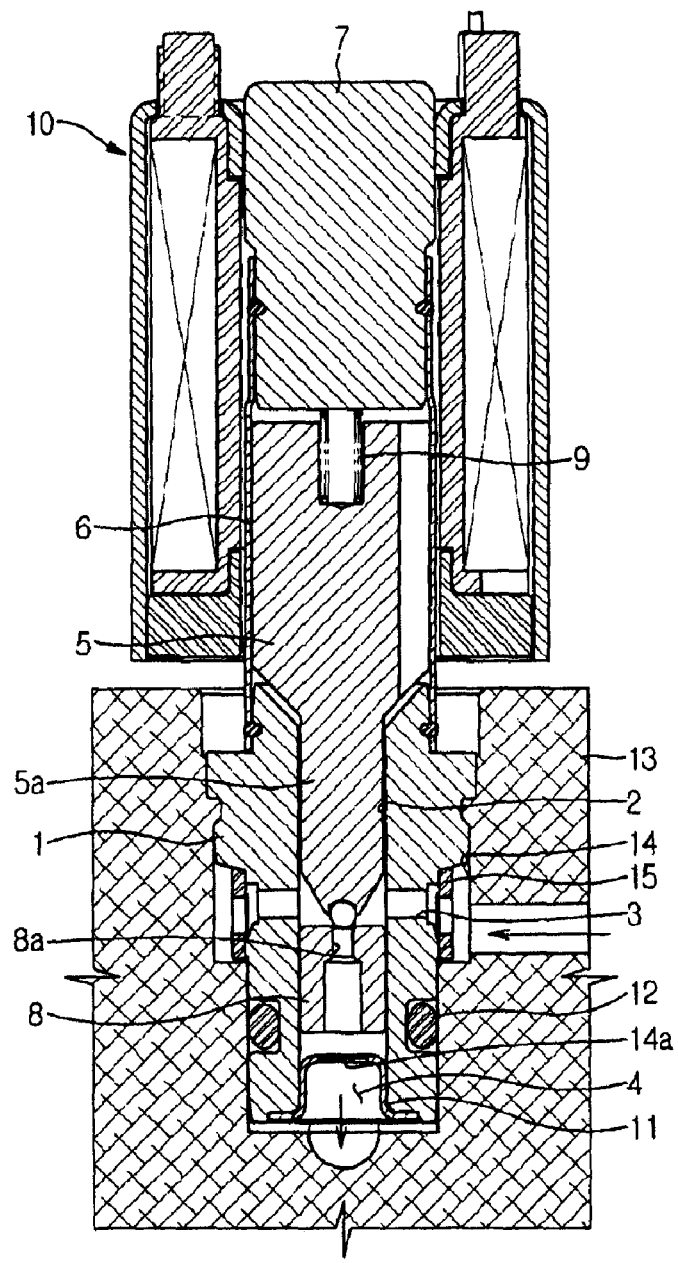
FIG. 1 is a sectional view of a conventional normally closed type solenoid valve.

Reference will now be made in detail to the embodiment of the present invention, examples of which are illustrated in the accompanying drawings, wherein like reference numerals refer to like elements throughout.

Figure 2:
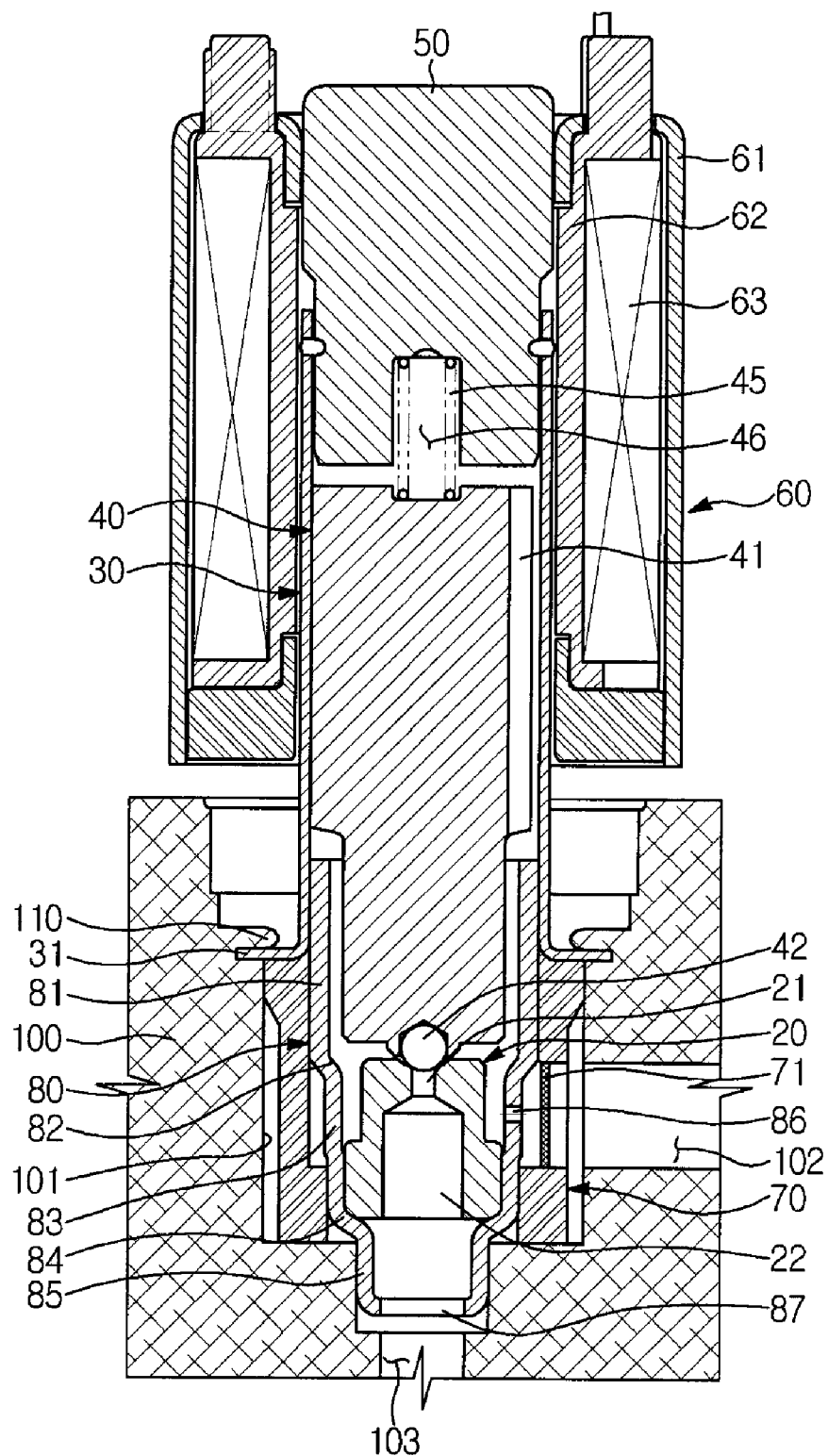
FIG. 2 is a sectional view of a solenoid valve for a brake system according to an embodiment of the present invention, illustrating a closed state of an orifice.

FIG. 2 is a sectional view of a solenoid valve for a brake system according to an embodiment of the present invention and illustrates a closed state of an orifice.

The solenoid valve for a brake system according to the present embodiment, as shown in FIG. 2, includes an excitation coil assembly 60, a valve core 50, a sleeve 30, a return spring 45, an armature 40, a seat 20, a seat housing 80, and a filter member 70.

Considering first the excitation coil assembly 60, the excitation coil assembly 60 has a cylindrical form and is coupled to an outer surface of the valve core 50 and to an outer surface of an upper part of the sleeve 30. The excitation coil assembly 60 includes a cylindrical coil case 61, a bobbin 62 received in the coil case 61, and an excitation coil 63 wound on an outer surface of the bobbin 62.

When power is applied to the excitation coil 63, a magnetic field is generated to move the armature 40 toward the valve core 50, causing an orifice 21 to be opened.

The valve core 50 is press-fitted into an upper end of the sleeve 30 and may be fixed by welding. A spring receiving recess 46 is formed in a lower surface of the valve core 50, in which the return spring may be received. Of course, the spring receiving recess 46 may be formed in an upper surface of the armature 40.

The return spring 45 is located between the valve core 50 and the armature 40 and normally presses the armature 40 toward the seat 20. As the return spring 45 presses the armature 40 toward the seat 20, normally, the orifice 21 may be closed by a sphere 42.

The armature 40 is vertically movably received in the sleeve 30. The armature 40 takes the form of a cylinder having an outer diameter corresponding to an inner diameter of the sleeve 30. An armature path 41 for oil flow is vertically defined in an outer surface of the armature 40. The sphere 42 is fitted in a lower end of the armature 40, to close the orifice 21 of the seat 20. Thus, the orifice 21 may be opened or closed by movement of the armature 40. Of course, the armature 40 may have its own opening/closing protrusion to open or close the orifice 21 without the sphere 42. The armature 40 is movable under guidance of an inner surface of the sleeve 30.

The sleeve 30 has a cylindrical form and is provided at one end thereof with a flange 31. The seat housing 80 is press-fitted into the end where the flange 31 is formed.

The flange 31 is secured to a modulator block 100 by a deformed portion 110 of the modulator block 100. The deformed portion 110 is caused by pressure applied around the flange 31 after the solenoid valve is press-fitted into the modulator block 100. Thus, the solenoid valve may be simply secured to the modulator block 100 without a separate member.

The orifice 21 of the seat 20 is formed in an upper surface of the seat 20, so as to be opened or closed by the sphere 42 of the armature 40. The seat 20 is further formed with an inner path having an inner diameter greater than that of the orifice 21. The seat 20 is press-fitted in the seat housing 80.

The seat housing 80 includes a large-radius portion 81 to be press-fitted into the sleeve 30. A first stepped portion 82 is provided below the large-radius portion 81 and in turn, a small-radius portion 83 is provided below the first stepped portion 82, the small-radius portion 83 having a radius smaller than that of the large-radius portion 81. Also, a second stepped portion 84 is provided below the small-radius portion 83 and in turn, a discharge path 85 is provided below the second stepped portion 84, the discharge path 85 having a radius smaller than that of the small-radius portion 83. The seat 20 is press-fitted into the seat housing 80 until a lower end of the seat 20 reaches the second stepped portion 84 formed between the small-radius portion 83 and the discharge path 85. Thus, the second stepped portion 84 determines the position of the seat 20 and prevents the seat 20 from dropping further downward.

An oil inlet 86 is perforated in a side of the small-radius portion 83, through which oil from an inlet path 102 of the modulator block 100 passes. Also, an oil outlet 87 is formed in a lower end of the discharge path 85 and is connected to a discharge path 103 of the modulator block 100.

The seat housing 80 is formed by deep drawing of a metal plate. This may assure easier product manufacture than a conventional complicated forged product. Also, the seat housing 80 may take the form of an integral member without requiring several components as in the related art. This may entail enhanced workability and cost reduction.

The filter member 70 is press-fitted in the modulator block 100, and a filter 71 is located in the inlet path 102 of the modulator block 100 to remove contaminants introduced thereinto. The seat housing 80 is press-fitted into the filter member 70.

Now, opening/closing operation of the above-described solenoid valve will be described.

FIG. 2 is a sectional view of the solenoid valve according to the embodiment and illustrates a closed state of the orifice. As shown in FIG. 2, when no power is applied to the excitation coil 63, the return spring 45 pushes the armature 40 toward the orifice 21, thus causing the sphere 42 of the armature 40 to close the orifice 21. Thus, no oil flows from the inlet 86 to the orifice 21.

Figure 3:
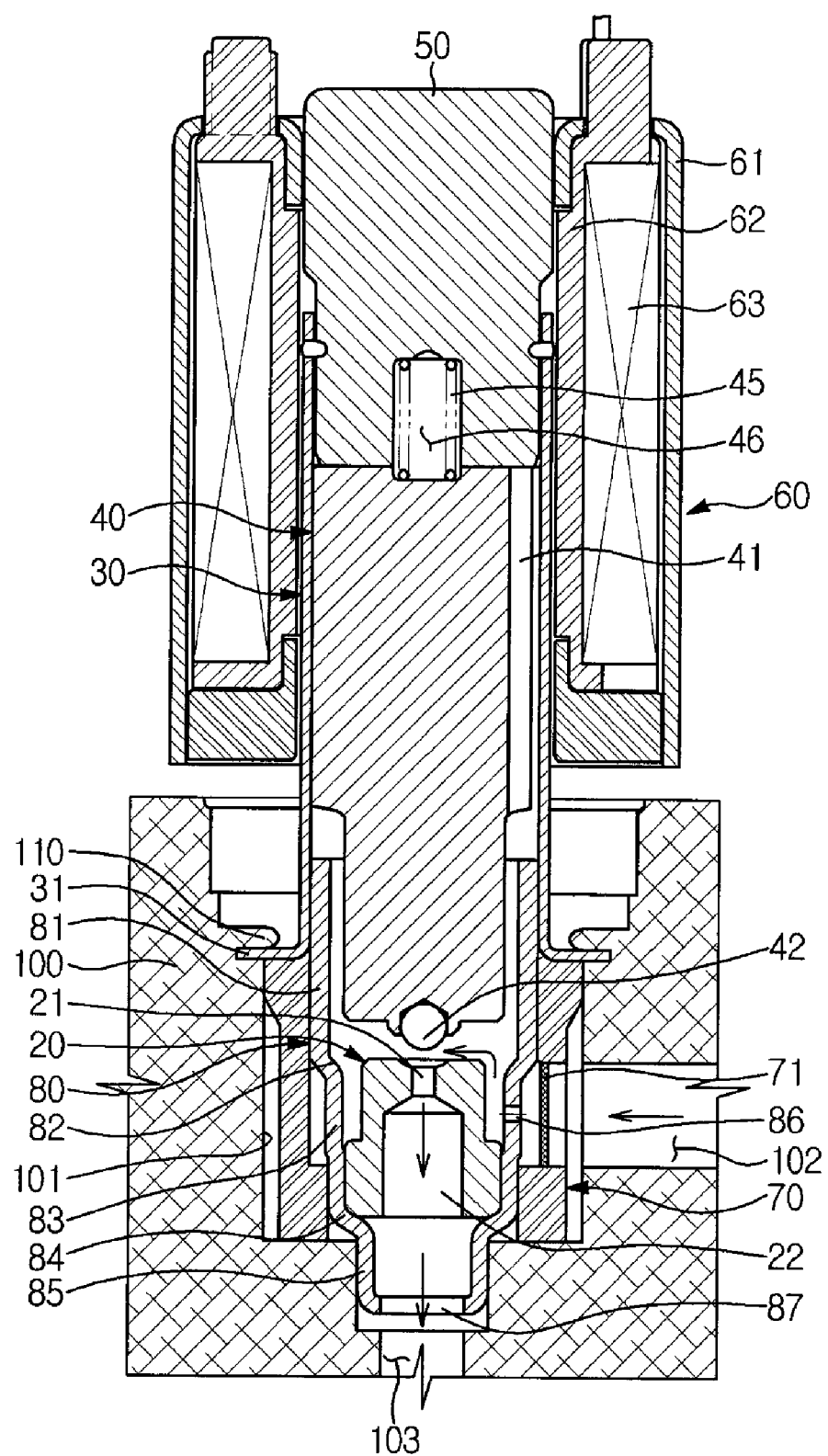
FIG. 3 is a sectional view of the solenoid valve according to the embodiment, illustrating an opened state of the orifice.

FIG. 3 is a sectional view of the solenoid valve according to the embodiment and illustrates an opened state of the orifice. As shown in FIG. 3, when power is applied to the excitation coil 63, the armature 40 overcomes elasticity of the return spring 45 by magnetic force generated between the armature 40 and the valve core 50, thus moving toward the valve core 50 and consequently, opening the orifice 21.

As is apparent from the above description, in a solenoid valve according to the embodiment of the present invention, a seat housing is formed by deep drawing of a metal plate, thus assuring easier product manufacture than a conventional complicated forged product. Also, the seat housing may take the form of an integral member without requiring several components as in the related art and this may entail enhanced workability and cost reduction.

Further, in a configuration wherein a flange of the solenoid valve is coupled to a deformed portion of a modulator block, the deformed portion may be obtained by pressure applied around the flange after the solenoid valve is press-fitted into the modulator block. Therefore, the solenoid valve may be simply secured to the modulator block without a separate member.

Furthermore, by press-fitting a seat into a specific stepped portion of a seat housing between a small-radius portion and a discharge path of the seat housing, positioning of the seat may be possible to prevent the seat from dropping further, resulting in easy assembly operation.

Although the embodiment of the present invention has been shown and described, it would be appreciated by those skilled in the art that changes may be made in these embodiments without departing from the principles and spirit of the invention, the scope of which is defined in the claims and their equivalents.

What is claimed is:

1. A solenoid valve for a brake system comprising:
   a valve core;
   a sleeve into one side of which the valve core is inserted;
   an armature movably received in the sleeve;
   a seat having an orifice that is opened or closed by the armature;
   a return spring to press the armature toward the orifice;
   a filter member press-fitted in a modulator block having an inlet path and outlet path, a filter being coupled to the filter member; and
   a seat housing having one side press-fitted into the filter member and the other side press-fitted into the sleeve, the seat being press-fitted in the seat housing, wherein the seat housing takes the form of a tubular member having an approximately constant thickness and is provided with a stepped portion to determine a position of the seat.

2. The solenoid valve according to claim 1, wherein the sleeve is provided at an end thereof with a flange to allow the sleeve to be coupled to the modulator block.

3. A manufacturing method of a solenoid valve for a brake system of claim 1, wherein the seat housing is integrally formed by deep drawing.

* * * * *